United States Patent [19]

Dempsey

[11] Patent Number: 4,497,620
[45] Date of Patent: Feb. 5, 1985

[54] SMALL PRESS FOR FORMING SHEET MATERIAL

[75] Inventor: Edmond N. Dempsey, Marion, Ind.

[73] Assignee: Peerless Machine & Tool Corporation, Marion, Ind.

[21] Appl. No.: 458,348

[22] Filed: Jan. 17, 1983

Related U.S. Application Data

[63] Continuation-in-part of Ser. No. 382,716, May 27, 1982, Pat. No. 4,435,143.

[51] Int. Cl.³ .......................... B29C 1/00; B29C 17/00
[52] U.S. Cl. ...................................... 425/145; 72/336; 425/214; 425/302.1; 425/397; 425/400; 425/406; 493/338; 493/352
[58] Field of Search ............... 425/163, 214, 397, 406, 425/302.1, 145, 398, 387.1, 164, 142, 150, 306, 289, 383, 400; 72/419, 452, 424, 426, 464, 335-337; 493/902, 85, 211, 338, 339, 353, 352, 464; 83/618

[56] References Cited

U.S. PATENT DOCUMENTS

| | | | |
|---|---|---|---|
| 1,037,844 | 9/1912 | Adriance et al. | 72/424 |
| 1,038,860 | 9/1912 | De Smith | 493/352 |
| 1,162,302 | 11/1915 | Moffet . | |
| 1,207,390 | 12/1916 | Frahm . | |
| 1,661,248 | 3/1928 | Barbieri . | |
| 1,780,012 | 10/1930 | Fine . | |
| 1,962,872 | 6/1934 | Moon | 80/26 |
| 2,015,798 | 10/1935 | Heitlage | 425/305.1 |
| 2,243,206 | 5/1941 | Hall | 74/50 |
| 2,275,758 | 3/1942 | Harris | 192/82 |
| 2,632,643 | 3/1953 | Egan et al. | 271/3 |
| 2,891,644 | 6/1959 | Davis | 192/75 |
| 3,002,222 | 10/1961 | Sevison | 425/145 |
| 3,007,201 | 11/1961 | Brümmer | 425/302.1 |
| 3,096,692 | 7/1963 | Crathern et al. | 93/49 |
| 3,193,881 | 7/1965 | Kostur | 425/302.1 |
| 3,355,073 | 11/1967 | Moore et al. | 493/338 |
| 3,448,604 | 6/1969 | Finsterwalder | 72/346 |
| 3,448,608 | 6/1969 | Bishop et al. | 73/94 |
| 3,477,270 | 11/1969 | Finsterwalder | 72/359 |
| 3,659,993 | 5/1972 | Brown | 425/214 |
| 3,754,705 | 8/1973 | Wiig | 226/90 |
| 3,948,162 | 4/1976 | Numba | 100/45 |
| 4,017,247 | 4/1977 | Soukup et al. | 53/559 |
| 4,056,186 | 11/1977 | Hill | 198/339 |
| 4,057,380 | 11/1977 | Hosoe | 425/324.1 |
| 4,158,539 | 6/1979 | Arends et al. | 425/451.4 |
| 4,170,621 | 10/1979 | Kiefer | 264/322 |
| 4,212,614 | 7/1980 | Holzinger | 425/214 |
| 4,255,382 | 3/1981 | Arends | 264/544 |
| 4,355,530 | 10/1982 | Chen | 72/452 |

FOREIGN PATENT DOCUMENTS

| | | |
|---|---|---|
| 2452050 | 5/1976 | Fed. Rep. of Germany . |
| 3141 | 3/1919 | Netherlands . |
| 53183 | 4/1967 | Poland . |
| 1538476 | 1/1979 | United Kingdom . |

Primary Examiner—Willard E. Hoag
Attorney, Agent, or Firm—Barnes & Thornburg

[57] ABSTRACT

A press includes a frame, a flywheel, a motor for driving the flywheel, and a shaft. A clutch and brake assembly is provided which is actuable for engaging and disengaging the shaft to the flywheel. An eccentric is journaled upon the shaft and rotates therewith. The eccentric rotates in a block which is slidably mounted in a head to permit the block to move laterally within the head. The head is vertically movable in response to vertical movements of the block. The press also includes an upper die which is mounted on the head and a lower die which is resiliently supported upwardly on a base. Movement of the head engages and disengages the upper die and lower die. One embodiment of the press includes a second set of dies mounted to the head for cutting a continuous sheet of material into a predetermined shape.

22 Claims, 11 Drawing Figures

SMALL PRESS FOR FORMING SHEET MATERIAL

This is a continuation-in-part of U.S. patent application Ser. No. 382,716, filed May 27, 1982 now U.S. Pat. No. 4,435,143.

This invention relates to devices employing dies to form sheet material into three-dimensional objects, and more particularly, to a press having a selectively variable dwell time and stroke rate.

The art of forming sheet material, such as paper stock and polystyrenes, into three-dimensional containers such as plates, food trays, and clamshell containers is known, as are the conventional presses which form the containers. Examples of the prior art are to be found in U.S. Pat. Nos. 4,149,841 and 4,246,223.

A conventional press includes a pair of dies which are movable between an engaged and a disengaged position. Unformed sheet material is inserted between the two dies, and the dies are then brought into engagement They are held in engagement with each other for a period of time (herein referred to as the dwell time) during which the three-dimensional container is formed. Tne dies are then separated, and the formed container is ejected from between the dies.

An electric motor normally runs the press which raises and lowers the dies. Typically, tne press contains a cam and follower arrangement which translates the rotational movement of the motor into the linear movement of the die head. The dwell time during which the dies are in engagement is usually determined by the shape and surface length of the cam. In order to change the press dwell time, it is usually necessary to change the cam, which can be a rather time-consuming process.

One other difficulty associated with the use of conventional cam and follower arrangements is that once the dies move into engagement, they stay engaged throughout the dwell of the cam.

Container manufacturers are often called upon to make a wide variety of containers having different size shape and material composition. Usually, a change in the type of container being manufactured entails a certain amount of expense in adapting the press to form the different container. The adaptation, or set up, usually involves a change of dies and often a change in the dwell time. In order to form a container properly, a dwell time must be selected which will allow the dies sufficient time to form a container of that particular size and shape. Additionally, dwell time selection is dependent upon the composition of the material being formed. For example, a different dwell time may be required to form a polystyrene container than to form a similarly shaped paper container. Also, different batches of the same material may require different dwell times to form identical containers properly. One factor which influences the dwell time required is the moisture content of the batch of material being formed.

A further problem associated with machines presently on the market is that most container-forming presses tend to be large and expensive machines. Although these machines can be very cost-effective when employed to make large runs of identical containers, they often become rather cost-ineffective when employed to make small runs of containers of varied size, shape, or material.

Another outgrowth of these older, larger machines being designed primarily for large runs is that the design of these machines does not permit the user to change dies quickly or to gain access easily to parts requiring servicing.

Another difficulty associated with the older, larger machines is that the large capital investment required to purchase or lease the older, larger machines often precluded smaller operations from purchasing enough machines to enable them to produce different containers simultaneously.

These and other difficulties with prior machines are overcome by the present invention wherein a press includes a frame, a flywheel, a motor for driving the flywheel, and a mechanism to couple the motor to the flywheel. A shaft is provided which is coaxial with the flywheel and selectively engageable therewith. A clutch is actuable for engaging the shaft to the flywheel. Normally, the clutch is a fluid-actuable clutch, and relies on air pressure to engage and release its mechanical couplings. Further, the press includes an upper die and a lower die. An eccentric drive, such as a scotch yoke, is provided for drivingly connecting the upper die to the shaft. The action of the shaft and the eccentric drive moves the upper die into and out of engagement with the lower die. A brake is provided for holding the shaft in a fixed position during the time when the upper die is in engagement with the lower die. The lower die is resiliently mounted to face upwardly on a normally stationary base.

In accordance with another embodiment of the instant invention, a press is provided for cutting and forming sheet material. The press includes a frame and a head mounted for movement on the frame between a blank cutting position and a blank-forming position. Cutting means are provided for cutting sheet material, and forming means are provided for forming sheet material. The cutting means is operably engaged by the head at a blank-cutting position, and the forming means is operatively engaged by the head at the blank-forming position.

Preferably, tranfer means are provided for transferring sheet material between the cutting means and the forming means. Also, advancing means are provided for advancing sheet material into the frame.

One feature of the instant invention is that, through the applicant's flywheel, clutch, and eccentric drive mechanism, the dwell time and stroke rate of the press are easily changed, thereby reducing the down time of the machine caused by the set-up time required to adapt the press to form a different type of container.

Another feature of the invention resides in the frame which is designed to facilitate servicing of the press and changing of the dies. In one embodiment, movable entry and exit conveyors are also provided which facilitate servicing of the press.

Another feature of the invention is the adaptability of the press so as to be used singly or in combination with a plurality of other similar presses. Multiple presses can be driven from a single power source, while retaining the selective controllability of each individual press.

Another feature of this press is that, since it can be produced less expensively than many conventional presses, and is designed to be used singly or in combination with other presses, smaller operators can initially purchase one press, and add others as their volume increases.

It is also a feature of one embodiment of this invention that cutting means are provided which are operatively engaged to the head for cutting sheet material.

This feature has the advantage of enabling the user of the machine to feed a continuous sheet of material, such as rolled sheet stock, into the press. The press includes means for both cutting the sheet material and for forming sheet material into a three-dimensional object.

These and other features of this invention and their inherent advantages will become apparent to those skilled in the art from the following description of preferred embodiments and the accompanying drawings illustrating the best mode of carrying out the invention, wherein.

Figure 1:
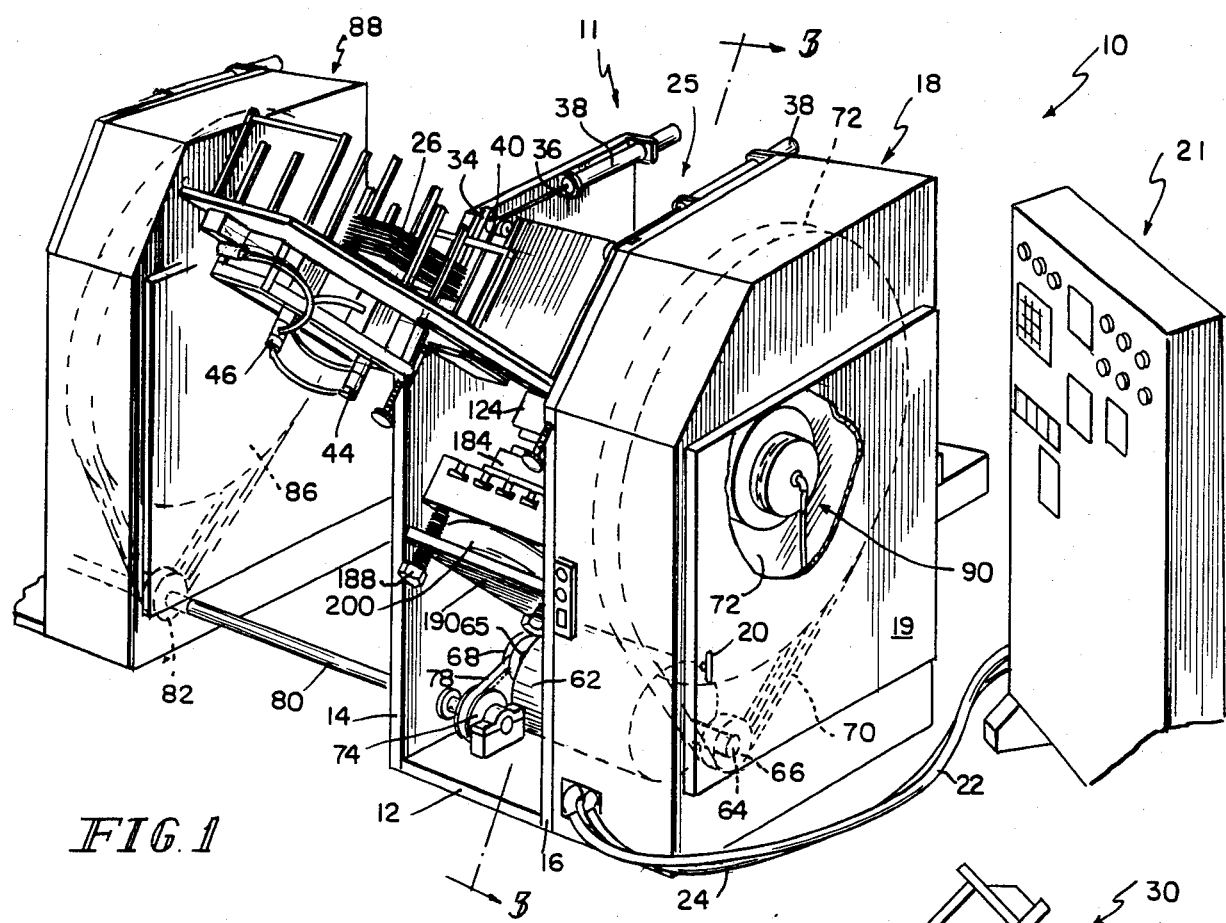
FIG. 1 is a perspective view, partially cut away, of the invention.
Figure 2:
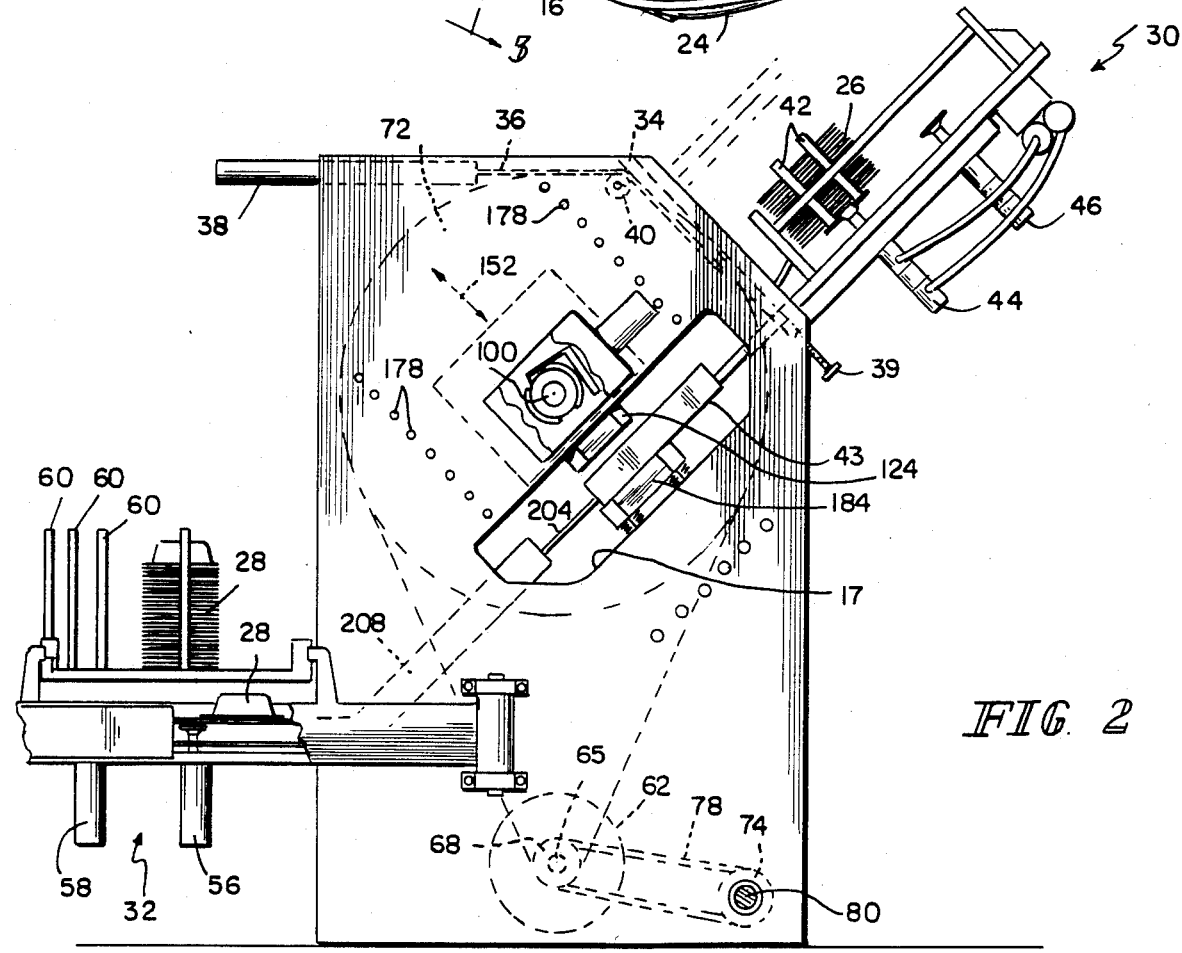
FIG. 2 is a side view, partially cut away, of the invention.
Figure 3:
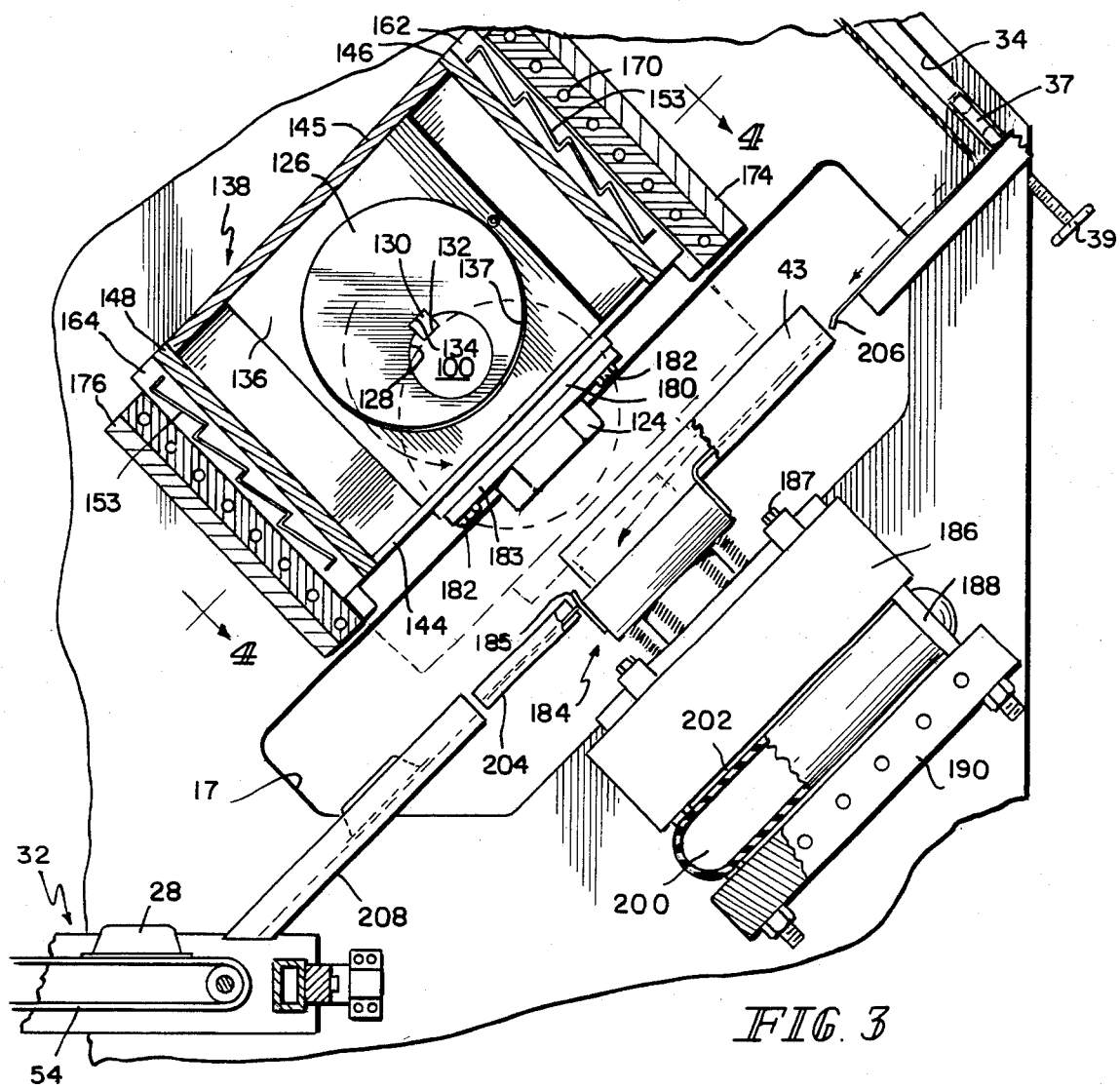
FIG. 3 is a cross-sectional view of the invention, taken along lines 3—3 of FIG. 1.

Referring now to FIGS. 1-3, a press 10 includes a frame 11 having a base 12, an upstanding wall 14 at one end of the base, and an upstanding wall 16 near the middle of the base 12. The walls 14, 16 and base 12 are preferably constructed of rather substantial hot-rolled plate in order to withstand the pressures exerted upon them by the press components supported on them, and the forces exerted by the press 10 in operation. Upstanding wall 14 further includes an opening 17 through which an operator can gain access to the pressing area 25.

Contiguous with wall 16 is housing 18 which includes a hingedly mounted door 19 having a handle 20 and latch (not shown) which enable the user to gain access to the inside of the housing 18 for servicing, but which protect the components inside the housing 18 when the door 19 is closed. A free-standing control panel 21 which communicates with the press 10 through umbilicals 22, 24 contains a plurality of controls through which the operator controls the actions of the press and adjusts such variables as stroke rate and dwell time, counters by which the operator keeps track of press 10 production, and microprocessors which are in communication with various components of the press. The microprocessors receive input from the various components and direct commands to various components based upon the operator's requests and the input received from the various components. A compressed air source (not shown) provides air to the press to operate and actuate the parts of the press 10 which are air-driven or actuated.

Between the upstanding walls 14, 16 of the press 10 is the pressing area 25 wherein blanks 26 are formed into containers 28. Precut blanks 26 are stacked onto an entrance conveyor 30 where they are individually moved into the pressing area 25, and then removed by, and stacked on, an exit conveyor 32. Entrance conveyor 30 and exit conveyor 32 are both movable to enable an operator to gain access to the pressing area 25 when servicing components therein. Entrance conveyor 30 is pulled upwardly and released downwardly by cables 36 and is guided by rollers 37 along tracks 34. Cables 36 are pulled over pulleys 40 in order to move the entrance conveyor 30 with a force in the same direction as the tracks 34 run. The cables 36 are actuated by pneumatic pistons 38. Adjustable levelers 39 are threadably engaged into the lower extremities of tracks 34. The levelers 39 are inserted into the tracks 34 to halt downward movement of the entrance conveyor 30 during times when the entrance conveyor 30 is being lowered into the operating position. The operator can adjust the levelers 39 to ensure that when the entrance conveyor 30 is lowered into its operating position, it will be in vertical alignment with feeding chute 43. FIG. 1 shows the entrance conveyor 30 in a partially raised position, and FIG. 2 shows the conveyor 30 in a lowered operating position. The entrance conveyor 30 further includes upstanding guide rods 42 which serve to position the blanks 26 for feeding them into the pressing area 25 and also serves to maintain the blanks 26 in a neat stack. The position of guide rods 42 is laterally and longitudinally adjustable in order to accommodate different-sized blanks 26. The blanks 26 are moved individually into the pressing area 25 by the action of pickups 44, 46. An additional pickup (not shown) can be added on the entrance conveyor 30 to serve as an intermediate blank 26 stop between the stack and the pressing area 25. The inclined angle of the entrance conveyor 30 allows the blanks 26 to fall into the pressing area 25 under the influence of gravity. The blanks 26 which are formed by this embodiment of press 10 are precut and, if necessary, prescored.

Figure 5:
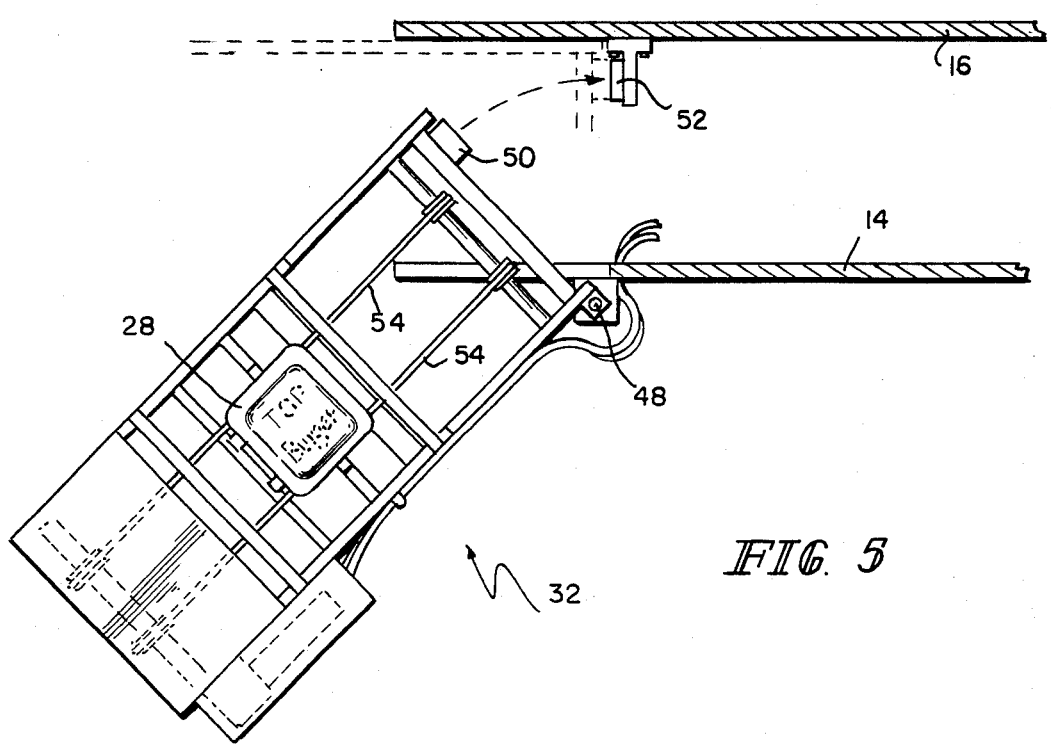
FIG. 5 is a partial plan view of the invention illustrating the swing-away feature of the exit conveyor.
Figure 6:
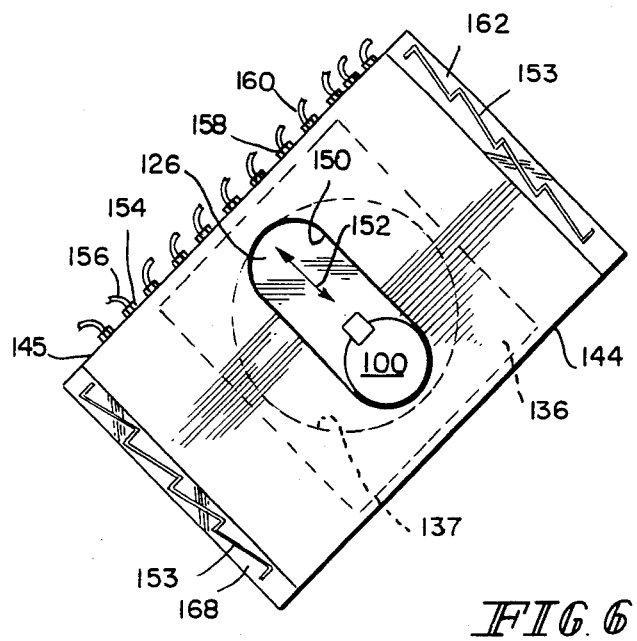
FIG. 6 is a side view of the invention showing the moving head and associated parts.

As best shown in FIGS. 1, 2, and 5, exit conveyor 32 is hingedly mounted on hinge 48 which allows the conveyor 32 to be swung aside and thus provide an operator or serviceman with easy access into the pressing area 25. A metallic plate 50 and magnet 52 serve to secure the exit conveyor 32 in place when the press 10 is not being serviced. Exit conveyor 32 further includes a pair of conveyor belts 54 for moving the formed containers 28 to the end of the conveyor, pickups 56, 58 for stacking the formed containers 28, and guide rods 60 for maintaining the formed containers 28 in a neat stack. The position of guide rods 60 is laterally and longitudinally adjustable.

A product marker (not shown) is also included for marking a formed container 28 after a predetermined number of containers 28 have been made by the machine. The marking of a selected container 28 enables the operator to remove a predetermined number of formed containers 28 from exit conveyor 32.

Figure 4:
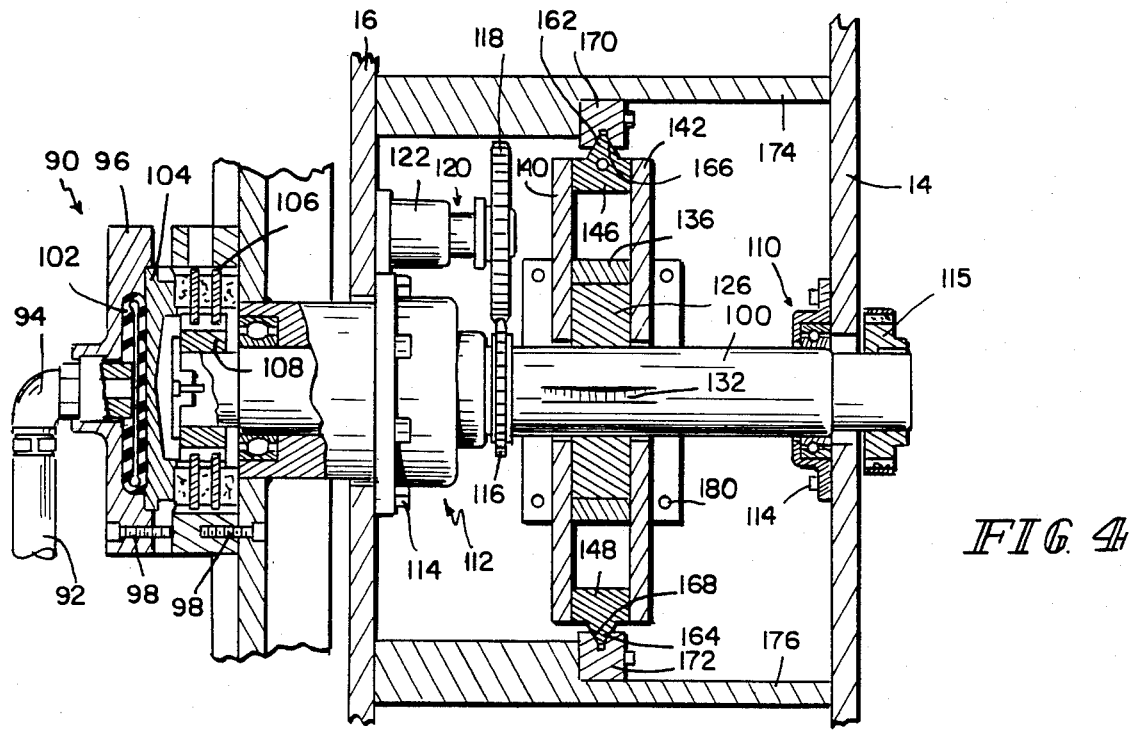
FIG. 4 is a cross-sectional view of the invention taken along lines 4—4 of FIG. 3.

Referring now to FIGS. 1 and 4, an electric motor 62 includes output shaft 64 and output shaft 65, each of which turns a pulley 66, 68, respectively. The motor 62 is preferably at least 3 hp if driving a single press, and more powerful if driving multiple presses. Pulley 66 turns a belt 70 which partially surrounds the outer surface of flywheel 72, thereby rotating flywheel 72 in the same direction as pulley 66. Pulley 68 rotates pulley 74 via a belt 78. The rotation of pulley 68 in turn rotates jackshaft 80 which, through pulley 82 and belt 84, rotates flywheel 86 of adjacent press 88. Several other presses can be run in a line through common jackshaft 80. The exposed portion of jackshaft 80 between adjacent presses 10, 88 is enclosed in a housing (not shown). Press 88 is also provided with a control panel (not shown) similar to control panel 20 so that presses 10, 88 can be individually controlled, thereby allowing the operator to form different containers on presses operated off the common jackshaft 80.

Air tube disk clutch 90 is secured to flywheel 86 so that the driving elements of the clutch 90 rotate coaxially with the flywheel 86. Clutch 90 is a preferably multiple plate clutch which is air-actuated via hose 92 which is rotatably mounted in the clutch 90 by connector 94. This allows the clutch housing 96 to rotate while permitting the air hose 92 to remain stationary. Clutch housing 96 is secured to flywheel 86 by a plurality of bolts 98. In the clutch 90 shown in FIG. 4, the clutch is engaged to the shaft 100 by pumping air under pressure into the air bladder 102, causing the bladder 102 to expand against pressure plate 104. The movement of pressure plate 104 forces the driving disks 106 into frictional engagement with the driven plates 108 which are coupled to the driven shaft 100.

Preferably, release springs (not shown) act to bias the driving disks 106 out of engagement with the driven plates 108 to minimize friction and contact between the driving disks 106 and driven plates 108 when the clutch 90 is disengaged from the shaft 100.

The clutch 90 is biased to be normally disengaged from shaft 100, and engages the shaft 100 only upon command. Shaft 100 is journaled on bearings 110, 112, the outer housings of which are securely attached by bolts 114 to the insides of walls 14, 16, respectively. The shaft 100 must be strong enough to support the weight exerted upon the shaft 100 by the clutch 90, flywheel 86, and other components. The bearings 110, 112 and bolts 114 must be strong enough to support the shaft 100 and the components supported by the shaft.

Brake 115 is mounted to the outer surface of wall 14 and is positioned proximate to shaft 100 to engage shaft 100. Brake 115 is spring-biased to be normally in engagement with shaft 100. The brake 115 includes an air release which, when applied, has sufficient strength to release the brake 115 from its spring-biased engagement with shaft 100, thereby allowing shaft 100 to rotate freely. The brake 115 engages shaft 100 when the press 10 is not running, and at any time during operation of the press 10 when the clutch 90 is disengaged from the shaft 100. The brake 115 is only released from engagement with the shaft 100 when the clutch 90 is engaged to the shaft 100. Press 10 will operate and will form containers 28, however, without the need of a brake 115.

Collared onto the shaft 100 is pinion gear 116 which rotates with shaft 100 and meshes with spur gear 118. Spur gear 118 is collared upon input shaft 120 of a rotary transducer 122. Rotary transducer 122 is in communication with the control panel 21 to inform the control panel 21 of the rotational position of the shaft 100. As will be discussed below, the rotational position of the shaft 100 is directly translatable into the vertical position of the upper die 124. The rotary transducer 122 is thereby capable of informing the control panel 21 of the vertical position of the upper die 124.

Referring now to FIGS. 1, 3, 4, and 6, an eccentric 126 is collared onto the shaft 100 through an opening 128 in the eccentric 126. The eccentric 126 is generally circular in shape. Opening 128 is offset from the center of the eccentric 126, thereby causing the diameter of the rotational path of eccentric 126 to be larger than the diameter of the eccentric 126. The eccentric 126 maintains its relative rotational position upon the shaft 100 by the insertion of a key 130 into corresponding openings 132, 134 of the shaft 100 and eccentric 126, respectively.

The eccentric 126 rotates coaxially with the shaft 100 in block 136. The exterior of block 136 is substantially rectangular in shape, having exterior length and width dimensions which are approximately equal to each other. Block 136 contains a generally circular opening 137, sized to slidably receive eccentric 126, and within which eccentric 126 rotates, imparting an eccentric path of travel to block 136, which results in reciprocating movement of head 138, within which block 136 is slidably contained. The block 136 is approximately as thick as eccentric 126. Head 138 includes side plates 140, 142, bottom plate 144, top plate 145, front plate 146, and rear plate 148. Side plates 140, 142 each include oblong-shaped openings 150 having their longest dimension in a direction parallel to arrow 152, shown in FIG. 2. The oblong-shaped openings 150 are provided in the side plates 140, 142 to provide clearance for the shaft 100 as the head travels in the directions indicated by arrow 152. Top plate 145 includes an inlet port 154 for lubricant line 156 and an outlet port 158 for lubricant line 160 through which lubricant is circulated in the area between the inner surfaces of the head 138 and the outer surfaces of the block 136, and also in the area between the inner surface of the block 136 and outer surface of the eccentric 126.

Front plate 146 and rear plate 148 include V-shaped tongues 162, 164 which are sized to be slidably received by V-shaped grooves 166, 168 cut in longitudinal bars 170, 172, all of which extend in a direction parallel to that indicated by arrow 152. Grease grooves 153 are provided on V-shaped tongues 162, 164 to retain lubricant and thereby reduce friction between the V-shaped tongues 162, 164 and the V-shaped grooves 166, 168. The retention of lubricant enhances the slidability of the tongues 162, 164 along the V-shaped grooves 166, 168. Longitudinal bars 170, 172 are securely attached to planar cross members 174, 176, respectively. Planar cross members 174, 176 extend between walls 14, 16 and are securely attached thereto by bolts 178.

Attached to bottom plate 144 is die mounting plate 180, to which the upper die 124 is removably secured by bolts 182. Preferably, mounting plate 180 is of a universal type which will fit most or all of the dies 124 commonly used in the industry.

The upper portion 183 of upper die 124 can be equipped with heating elements (not shown) which serve to heat the upper die 124 and thereby quicken the formation of flat blanks 26 into formed containers 28. Upper die 124 includes air jets (not shown) which prevent the formed containers 28 from sticking to the upper die 124 after being pressed thereby.

Lower die 184 is mounted onto floating base 186 by bolts 187. Lower die 184 illustrated in FIGS. 1 and 3 is a telescoping die. Floating base 186 may be equipped with heating elements (not shown) to facilitate formation of containers 28. Mounted to lower die 184 are a pair of upstanding stops 185 which are sized and positioned to stop a blank 26 from sliding past the lower die 184, but to allow a formed container to slide therethrough.

The width of a formed container 28 having raised portions is generally narrower than the flattened blank 26 from which it is formed, thereby allowing a formed container 28 to slide through an opening through which a blank 26 would not pass.

Floating base 186 is slidably mounted on support rods 188 to stationary base 190, such that position of the floating base 186 is vertically movable. Interposed between floating base 186 and stationary base 190 is air cushion 200 upon which the floating base 186 rests and which preferably is constructed out of a thick pliable rubber which is strong enough to withstand the pressure exerted on it by the floating base 186 and lower die 184 through the action of the upper die 124.

Air cushion 200 also serves to counteract the force of gravity by biasing floating base 186 away from stationary base 190. When a heating element is used in either the upper die 124, lower die 184, or floating base 186, an insulating sheet 202 should be interposed between the floating base 186 and the air cushion 200. The insulating sheet 202 helps to retard premature cracking and drying of the rubber in air cushion 200, and aids in preventing rupture of air cushion 200 caused by the rubber in the air cushion 200 becoming melted due to the heat of the floating base 186.

Feeding chute 43 and exit chute 204 are mounted onto lower die 184 and are vertically movable therewith. Entrance chute 206 and exit chute 208 are stationarily mounted to one or both of upstanding walls 14, 16. Alternatively, feeding chute 43 and removing chute 204 can be lengthened to capture blanks 26 directly from the entrance conveyor 30 in the case of the feeding chute 43, and to deliver formed containers 28 directly to the exit conveyor 32 in the case of the removing chute 204. An opening 173 is provided in upstanding wall 14 to enable the operator to gain access to the pressing area 25 to change the upper and lower dies 124, 184.

Figure 11:
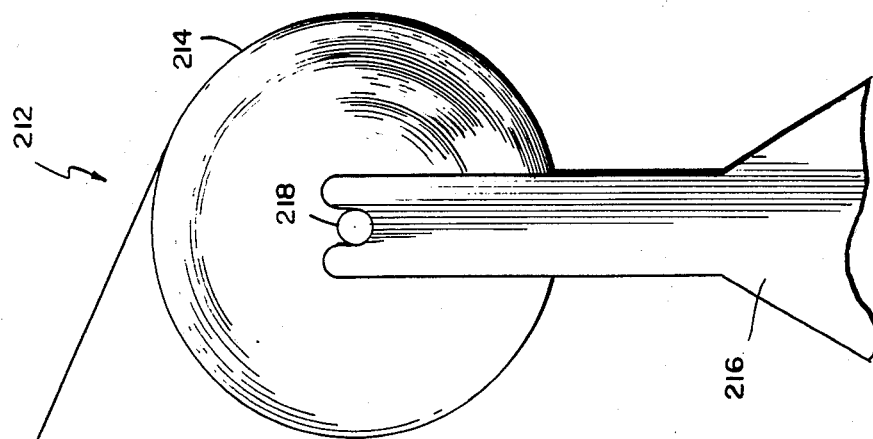
FIG. 11 is a cross-sectional view, similar to FIG. 3, of another embodiment of the invention.
Figure 11:
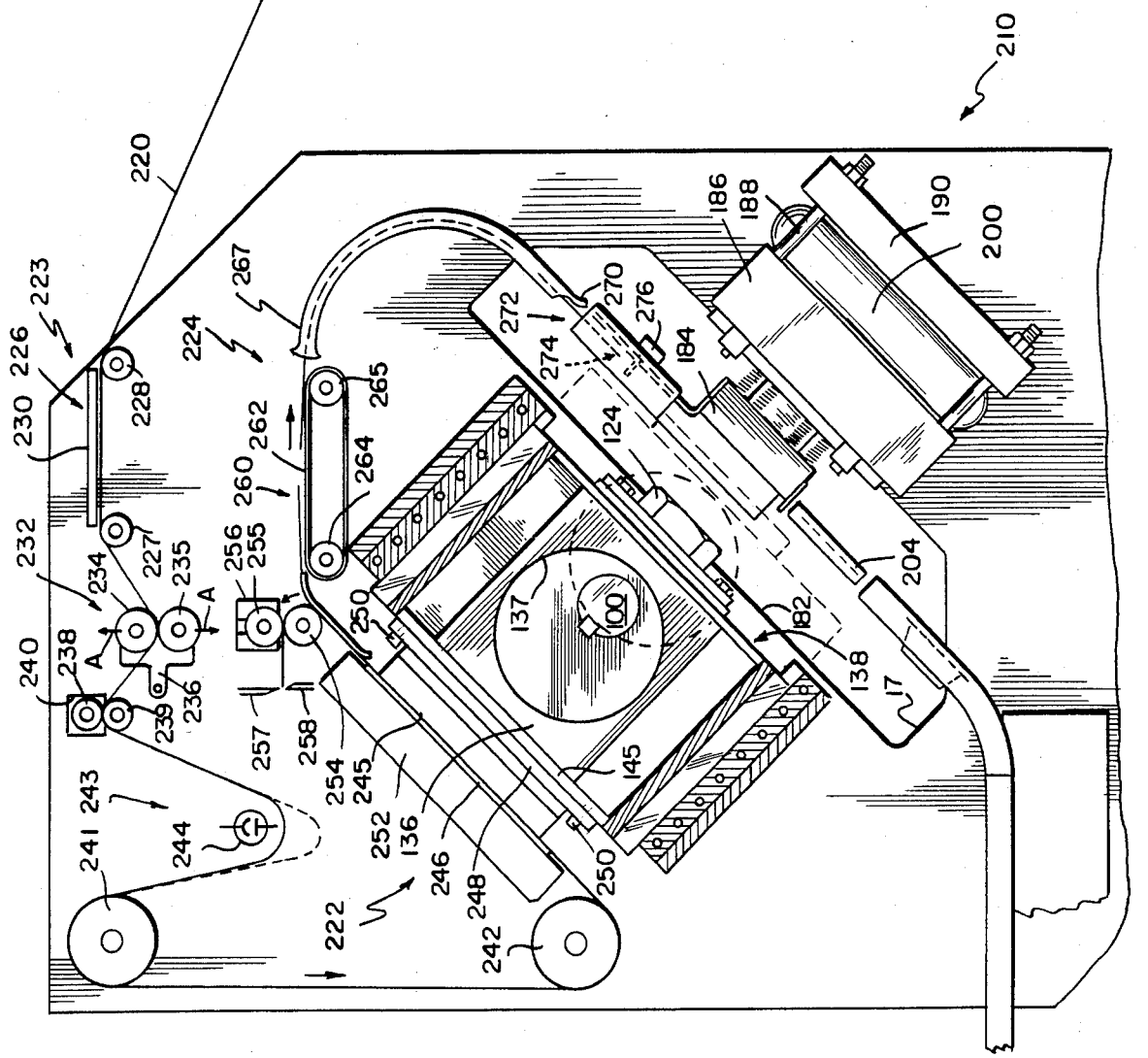

Another embodiment of the instant invention is shown in FIG. 11 wherein press 210 is adapted for cutting and forming sheet material. In this embodiment, entrance conveyor 33, pulley 40, pneumatic pistons 38, tracks 34, cables 36, rollers 37, levelers 39, and associated parts are eliminated. Entrance chute 206 and feeding chute 43 are modified.

Press 210 is adapted to receive material from a sheet material source 212 such as material roll 214 which is rotatably mounted upon unwind stand 216 by axle 218. The sheet material source 212 produces a continuous sheet of material 220 which is fed into frame 11 of press 210. Press 210 includes a cutting means 222 for cutting sheet material and advancing means 223 for advancing sheet material into the frame 11, and transfer means 224 for transferring sheet material between the cutting means 222 and forming means 124, 184.

Guide means 226 includes rollers 227, 228 and paper guide 230. Preferably, paper guide 230 is constructed of a substantially planar steel plate having a pair of upstanding flanges (not shown) at either side of the plate to provide lateral guidance for sheet material 220 entering into frame 11. Decurling means 232 includes a pair of decurling rollers 234, 235 which are rotatably mounted onto an arm 236 which is pivotally connected to frame 11 to permit selective adjustment of the decurling rollers 234, 235 along a line denoted by arrows A. By selective adjustment of the decurling rollers 234, 235, the user can vary the amount of decurling performed upon sheet material 220.

Drive rollers 238, 239 are driven by the output shaft of gear motor 240 having a clutch (not shown). The clutch serves to enable the user to pull material through the rollers 238, 239 without having to start the press 210. A pair of freely rotating pulleys 241, 242 are rotatably mounted to frame 11 to provide a pathway for continuous sheet material 220. Pulley 242 also serves to position sheet material 220 prior to placement of sheet material 220 adjacent the cutting means 222. A loop-forming means 243 is provided which includes electric eye control 244. Enough space is left between drive rollers 238, 239 and pulley 241 to allow for an excess of sheet material 220 therebetween.

Cutting means 222 includes a cutting die 245 having a band-like blade 246 which is disposed in a groove (not shown) in cutting die 245. The groove (not shown) and band-like blade 246 are shaped to conform to the shape which the blank 26 is to take after cutting and prior to forming. Cutting die 245 is securedly attached to base 248 by bolts 250. Base 248 is securedly attached to top plate 145 of head 138. Steel rule cutting die plate 252 is stationarily mounted to frame 11 to provide a surface against which band-like blade 246 can cut sheet material 220.

Transfer means 224 includes a second set of pull rollers 254, 255 which are positioned with respect to cutting die 245 and cutting die plate 252 so as to pull waste sheet material in an arcuate path. Second pull rollers 254, 255 are drivably connected to the output shaft of gear motor 256 having a clutch brake mechanism (not shown). The clutch enables the user to pull material 220 through the rollers 254, 255, and the brake enables the rollers to be stopped quickly to ensure proper placement of material 220 on cutting means 222 when the material 220 is being cut.

A pair of cut-off knives 257, 258 are provided adjacent the second pull rollers 254, 255 to cut waste sheet material 220 pulled through rollers 254, 255. Preferably, air jets (not shown) are disposed near cut-off knives to blow cut sheet material away from rollers, and to a vacuum hose (not shown) which conveys the waste sheet material away from the press, and delivers it to a central collection point. A blank conveyor 260 is provided for moving separated blanks laterally. Blank conveyor 260 includes an endless belt 262 which is mounted by a pair of rollers 264, 265, at least one of which is driven. Roller 264 is driven by the output shaft of a gear motor (not shown) which is mounted to the frame.

Blank slide 267 is provided for moving the blank downwardly into a position adjacent forming die 124, 184. Blank slide 267 is preferably constructed of sheet metal. Entrance chute 270 is connected to frame 11 for receiving blanks fed through blank slide 264 and feeding them onto feeding chute 272. Feeding chute 272 is mounted onto lower die 184 and includes an intermediate stop means 274 such as pneumatically controlled intermediate stop cylinder 276 for placing a blank in a holding position before the blank is moved to a position adjacent forming dies 124, 184.

Referring now to FIGS. 7–10, schematic representations are shown depicting the relative positions of the cross members 300, 302, clutch 304, brake 306, head 308, block 310, eccentric 312, shaft 314, upper die 316, lower die 318, air cushion 320, stationary base 322 for the lower die 318, cutting die 324 and cutting die plate 326 during a typical pressing cycle of the press 328. Press 328 is represented as being similar to press 210.

The described cycle is similar for press 10, except for the inclusion of the sheet material cutting.

Figure 7:
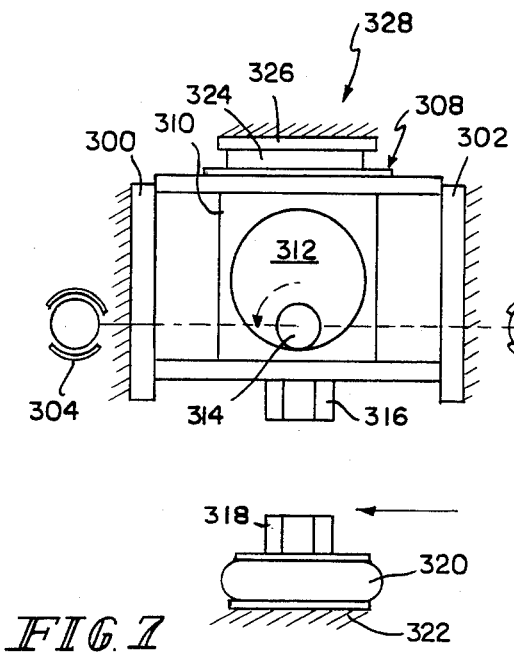
FIG. 7 is a schematic representation of the press when the eccentric is at top dead center.

Referring now to FIG. 7, the press 328 is shown with the shaft 314 and eccentric 312 at top dead center, which is the press' 328 initial rest position for changing upper 316 and lower 318 dies or the like. This is also the position wherein cutting die 324 and cutting die plate 326 are engaged to cut sheet material into a formable element. During the normal pressing cycle when flywheel 72 is rotating, the shaft 314, eccentric 312, block 310, and head 308 do not remain in this raised position but rather continue through this position in a smooth cycle. When initially in this position, the clutch 304 is disengaged from the shaft 314 and the brake 306 is spring-biased to engage shaft 314, thereby preventing shaft 314 from rotating. Eccentric 312 raises the block 310 to the uppermost vertical position in its cycle while laterally centering the block 310 in the head 308. This results in the head 308 being in its uppermost raised position, and cutting die 324 being engaged with cutting die plate 326.

Upper die 316 is fully disengaged from lower die 318, and air cushion 320, upon which lower die 318 rests, is in a relatively uncompressed state, having only the weight of the lower die 318 acting to compress it. It is during the press's quarter cycle shown in FIG. 7 when a blank 26 would normally be inserted between upper die 316 and lower die 318.

When the press 328 receives a command to begin a pressing cycle, clutch 304 is air-actuated to engage shaft 314, and thereby begin rotating shaft 314. Simultaneously, brake 306 is air-actuated to release shaft 314 and thereby permit it to rotate in response to the engagement of shaft 314 by clutch 304.

Figure 8:
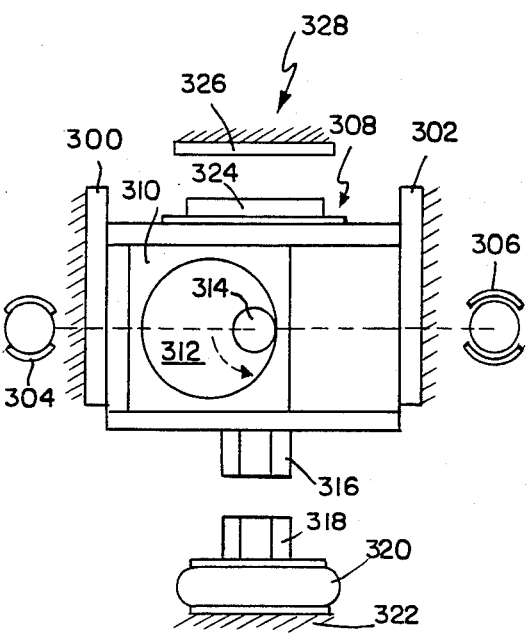
FIG. 8 is a schematic representation of the press when the eccentric is 90° past top dead center.

Referring now to FIG. 8, the press 328 is shown at a position in its pressing cycle wherein the shaft 314 and eccentric 312 are 90° past top dead center. At this position, the clutch 304 remains engaged to shaft 314 and the brake 306 remains released therefrom. The rotational position of the eccentric 312 in the block 310 has caused the block 310 to move laterally and downwardly. As the head 308 is not laterally movable, the block 310 moves laterally within the head 308, without affecting the lateral positioning of the head 308. The head 308 is vertically movable, and will so move in response to vertical movement of block 310. As shown in FIG. 8, the head 308 has responded to the downwardly vertical movement of block 310, by also moving vertically downward. Being mounted upon head 308, the upper die 316 and cutting die 324 also move downwardly. The relative positions of the cutting die plate 326, lower die 318, and air cushion 320 remain unchanged.

Approximately 150° past top dead center, the clutch 304 begins its disengagement from shaft 314, simultaneously with the brake 306 commencing its engagement with shaft 314.

Figure 9:
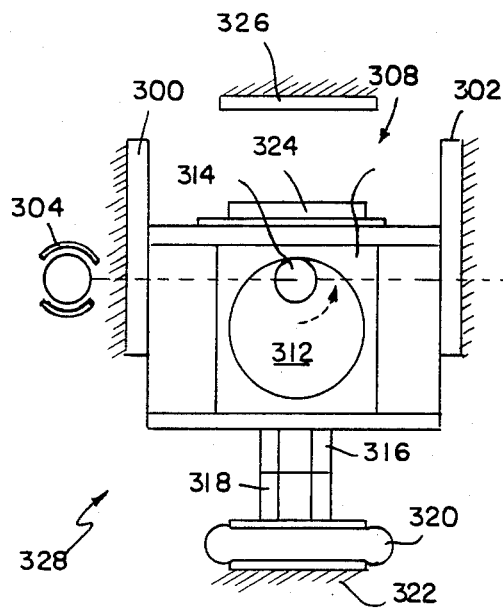
FIG. 9 is a schematic representation of the press when the eccentric is at bottom dead center (180° past top dead center)

Referring now to FIG. 9, the press 328 is shown in its pressing cycle at a point at which the shaft 314 and eccentric 312 are at bottom dead center (180° past top dead center). The clutch 304 is disengaged from shaft 314 and brake 306 is engaged to the shaft 314. Shaft 314 is at rest, and all movement of the eccentric 312, block 310, head 308, cutting die 324, upper die 316, lower die 318, and air cushion 320 is stopped.

The above-mentioned components will remain stopped in this position until such time as clutch 304 is air-actuated to engage shaft 314, and the brake 306 is air-actuated to disengage shaft 314. The period of time during which the components remain in this position is the dwell time. As stated above, the dwell time is selectively variable, and is controllable by the operator through the control panel 21.

From its position in FIG. 7 to its position in FIG. 8, the rotation of the eccentric 312 has laterally moved the block 310 to a centered position within head 308 and has vertically moved block 310 downwardly to its lowermost vertical position in the cycle. The vertically downward movement of block 310 has moved head 308 downwardly to its lowermost vertical position in the cycle. Downward movement of upper die 316 has caused it to engage lower die 318, moving lower die 318 in a downwardly vertical direction. The downward movement of lower die 318 has caused air cushion 320 to become compressed between lower die 318 and stationary base 322. The expansive forces exerted by the air cushion 320 to counteract the compressive forces exerted upon the air cushion 320 by the head 308, upper die 316, and lower die 318 maintain the lower die 318 in intimate engagement with upper die 316. Further, these above-mentioned forces aid in providing the press force necessary to form the blank 26 into a formed container 28. The vertical compressibility of air cushion 320 also allows the upper die 316 to engage the lower die 318 at a point in the cycle prior to bottom dead center, and to release the lower die 318 at a point in the cycle past bottom dead center.

Figure 10:
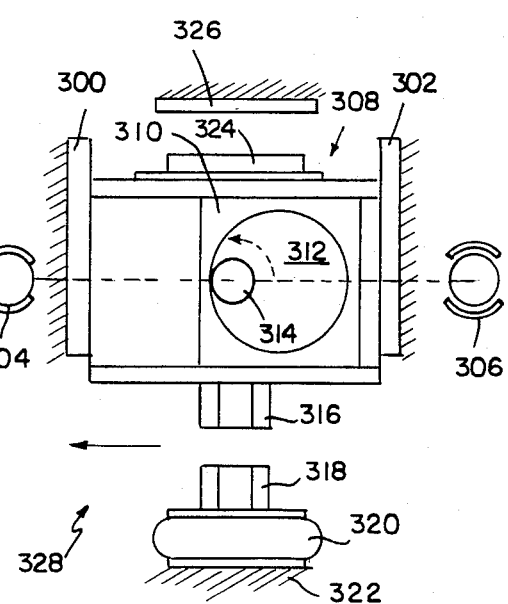
FIG. 10 is a schematic representation of the press when the eccentric is 270° past top dead center.

At the end of the selected dwell time, clutch 304 is air-actuated to re-engage the shaft 314 simultaneously with the air actuation of brake 306 to release shaft 314, thereby causing eccentric 312 to rotate. Referring now to FIG. 10, the press 328 is shown at its point in the pressing cycle wherein the shaft 314 and eccentric 312 are 270° past top dead center. At this stage, the clutch 304 is engaged to rotate the shaft 314, and the brake 306 is actuated to release the shaft 314. The rotational movement of eccentric 312 in block 310 has laterally moved the block 310 within the head, and has moved the head 308 vertically upward through the vertical, upward movement of block 310. Upper die 316 is pulled out of engagement with lower die 318, and air cushion 320 is released from its compressed state. Normally, at some point during this stage of the cycle, air will be applied to the formed container 28 to release it from engagement with the dies 316, 318. Also, advancing means 223 will have advanced the continuous sheet of material 220 into a position wherein the cutting means 222 can cut another blank. Thereafter, the press 328 continues through the various illustrated stages of the cycle until it again comes to dwell at the bottom dead center position shown in FIG. 9.

Referring now to FIGS. 1-3, in operation of the press, unformed blanks 26, which are stacked on entrance conveyor 30, are individually removed from the stack by pickups 44, 46. Blank 26 slides down the entrance conveyor 30 and onto the entrance chute 206, then onto lower die 184 mounted to feeding chute 43, and finally comes to rest on lower die 184. The blank 26 is stopped at, and held onto, lower die 184 by stops 189. The blank 26 is then formed into a container 28 through the engagement of lower die 184 and upper die 124. When dies 124, 184 are released from engagement, air is blown against the formed container 28 to prevent it from sticking to upper die 124. Through the action of gravity, aided by blown air to reduce the friction of the container as it slides down the removing chute 204 and exit chute 208, thereby speeding its travel to the exit conveyor 32, the formed container 28 slides down the lower die 184 mounted removing chute 204, onto the exit chute 208, and finally onto exit conveyor 32. Once on exit conveyor 32, container 28 is moved by conveyor belts 54 toward the end of exit conveyor 32. At an appropriate point, pickups 56, 58 stack the container 28 onto the bottom of a stack of containers 28.

The operation of press 210, shown in FIG. 11, will now be described. The drive rollers 238, 239 pull continuous sheet material 220 from material roll 214 which is rotatably mounted upon unwind stand 216. The continuous sheet material 220 is pulled upwardly over roller 226, laterally positioned by paper guide 230, and pulled over roller 227. The sheet material 220 is pulled between decurling rollers 234, 235 to remove whatever curl was imparted to sheet material 220 by its winding on material roll 214.

Second pull rollers 254, 255 pull the continuous sheet material 220 around pulleys 241, 242 and between cutting die 245 and steel rule cutting die plate 252. An excess of material is left between pull rollers 238 and pulley 241. The size of the loop is controlled by electric eye 244 which is in communication with control panel 21. Should the continous sheet material 220 break the light beam emitted by electric eye control 244, the press can be made to shut down to prevent damage to sheet material 220 and the containers 28 formed by the press 210. Generally, pull rollers 238 pull in a generally continuous manner, whereas second pull roller 254, 255 pull in an intermittent manner, much like the pull rollers of a movie projector. Pull rollers 254, 255 pull a selected length of material between cutting die 254 and steel rule die plate 252, and then stop the advance of the sheet material 220 to allow the cutting die 245 and steel rule die plate 252 to cut a stationary target. This ensures that the sheet material 220 will be accurately and sharply cut, and not torn due to movement of the sheet material 220, while blade 246 is in contact therewith.

The movement of pull rollers 238, 239 and second pull rollers 254, 255 is coordinated with the movement of head 138 and shaft 100 to ensure that sufficient material 220 is available to enable the cutting means 222 to cut a fully sized blank 26, and to ensure that the material 220 is stationary when the blade 246 of cutting die 245 is engaged with steel rule die plate 252

After the sheet material 220 is cut by cutting means 222, the waste sheet material is pulled in a severe, arcuate manner between pull rollers 254, 255. Due to the severe bending of the waste sheet material, the waste sheet material is separated from the blank cut by cutting means 222. Waste sheet material is then cut by cutting knives 257, 258. Material so cut is then blown by air jets (not shown) to an area of the press 210 near a vacuum hose (not shown) which removes the sheet materials particles from the area of the press 210. The blank cut by cutting means 222. is conveyed laterally by blank conveyor 260 and is delivered to blank slide 267. Blank slide 267 transports the blank laterally and downwardly, delivering it to entrance chute 270. The blank travels from entrance chute 270 onto feeding chute 43. Disposed on feeding chute 43 is an intermediate stop means 274 which holds the blank in a holding position before feeding it into the area adjacent to cutting dies 124, 184. The forming step of press 210 is similar to that of press 10 shown in FIGS. 1-4, and described above.

Although the invention has been described in detail with reference to certain preferred embodiments and specific examples, variations and modifications exist within the scope and spirit of the invention as described and as defined in the following claims.

What is claimed is:

1. A press for cutting and forming sheet material comprising
   a frame,
   a head mounted for reciprocal movement on the frame between a blank-cutting position at one extreme of the head's reciprocal movement and a blank-forming position at the opposite extreme of the head's reciprocal movement,
   cutting means for cutting sheet material and forming means for forming sheet material,
   the cutting means being operatively engageable by the head at the blank-cutting position, and the forming means being operatively engageable by the head at the blank-forming position.

2. The invention of claim 1 further comprising a transfer means for transferring sheet materal between the cutting means and the forming means, and advancing means for advancing sheet material into the frame.

3. The invention of claim 2 further comprising a control means for controlling the advancing means in response to the position of the head.

4. A press for cutting and forming sheet-like material comprising:
   a frame,
   a head reciprocably movable on the frame between a first and a second position,
   a first pair of mating dies supported with respect to the frame, and cooperably engageable by the head for cutting sheet-like material into a blank of predetermined shape when the head is in the first position,
   a second pair of mating dies supported with respect to the frame and cooperably engageable by the head for forming the blank cut by the first pair of dies when the head is in the second position, and
   a transfer means for transferring the blank from the first pair of dies to a forming postion between the second pair of dies.

5. The invention of claim 4 further comprising a means for advancing sheet material from a material roll to the first pair of dies, the advancing means including a control means for controlling said advancing means.

6. The invention of claim 4 further comprising means for advancing sheet material to the first pair of dies, the advancing means including a means for decurling sheet material.

7. The invention of claim 4 further comprising a pathway through which sheet material can travel from a material roll to a position adjacent the first pair of dies comprising
   a means for guiding the sheet material into the pathway,
   a means for decurling the sheet material, and
   a means for advancing the sheet material to a position adjacent the first and second dies.

8. The invention of claim 4 further comprising a means for separating blanks from waste sheet material and wherein the blank-transferring means comprises an intermdiate stop means for stopping the blank in a holding position prior to advancing it to the second pair of dies.

9. The invention of claim 4 wherein the transfer means comprises a conveyor for laterally moving the blank and a slide for moving the blank downwardly..

10. The invention of claim 4 further comprising an advancing means for advancing sheet material from a generally continuous roll to the first pair of dies, the advancing means including means for maintaining an excess of material between a portion of the advancing means and the first pair of dies.

11. The invention of claim 10 wherein the advancing means comprises a plurality of rollers and the means for maintaining an excess of material comprises a loop-forming means for forming a loop and means for controlling the advancing means in response to the size of the loop formed by the loop-forming means.

12. An apparatus for forming sheet material into a formed element comprising
   a frame,
   a head movable with respect to the frame in first and second opposite directions, the head including first and second opposed mounting surfaces,
   a cutting die, a portion of which is carried by the first mounting surface for cutting sheet material when the head moves in the first direction,
   a forming die, a portion of which is carried by the second mounting surface for forming sheet material when the head moves in the second direction, and
   a transfer means for transferring sheet material between the cutting die and the forming die.

13. The invention of claim 12 further comprising a decurling means for decurling the continuous sheet.

14. The invention of claim 12 wherein the cutting die includes a member supported on the frame engageable with the cutting die portion carried by the first mounting surface, and
   the forming die includes a member supported on the frame engageable with the forming die portion carried by the second mounting surface.

15. The invention of claim 12 further comprising means for advancing the sheet material to the cutting die comprising a plurality of rollers for advancing the continuous sheet, a loop-forming means for forming a loop of material between the advancing means and the cutting die, and a control means for controlling the advancing means in response to the size of the loop.

16. The invention of claim 12 further comprising guiding means for properly positioning the continuous sheet for feeding into the press and wherein the transfer means includes stop means for stopping the sheet material in a holding position prior to the placement of the sheet material adjacent one of the forming or cutting dies.

17. The invention of claim 12 wherein the means for transferring the sheet material comprises a means for separating the cut sheet material of the cutting die from waste sheet material, a conveyor for laterally moving the cut sheet material, a slide for downwardly moving the cut sheet material, and a stop means for stopping the cut sheet material in a holding position prior to the cut sheet material advancing to a position adjacent the forming die.

18. The invention of claim 17 wherein the means for separating the cut sheet material from waste sheet material comprises a pulling means for pulling waste material away from the cut sheet material and a second cutting means for cutting the waste material so pulled.

19. A press for cutting and forming sheet material comprising
   a frame,
   a cutting means having a cutting means member carried by the frame,
   a forming means having a forming means member carried by the frame,
   a head mounted for reciprocal movement between the cutting means member and the forming means member, the head being movable in a first direction to cause the cutting means to cut the sheet material, and in a second direction opposite to the first direction to cause the forming means to form the sheet material.

20. The invention of claim 19 wherein the head includes an upper surface and a lower surface,
   the cutting means includes a portion mounted to the upper surface of the head for movement with the head for engaging the cutting means member for cutting the sheet material, and
   the forming means includes a portion mounted to the lower surface of the head for movement with the head for engaging the forming means member for forming the sheet material.

21. The invention of claim 19 wherein the cutting means includes a portion carried by said head for engaging the cutting means member for cutting the sheet material and the forming means includes a portion carried by said head for engaging the forming means member for forming the sheet material.

22. The invention of claim 21 wherein the portion of the cutting means carried by the head and the portion of the forming means carried by the head are fixed to opposed surfaces of the head.

* * * * *